United States Patent [19]

Ochmann et al.

[11] Patent Number: 5,753,028
[45] Date of Patent: May 19, 1998

[54] FERRIFEROUS BISMUTH VANADATE PIGMENTS

[75] Inventors: Harald Ochmann, Dannstadt-Schauernheim; Hansulrich Reisacher, Sachsenheim; Helmut Knittel, Ludwigsburg; Norbert Mronga, Dossenheim; Günter Etzrodt, Stuttgart; Henning Wienand, Neulussheim, all of Germany

[73] Assignee: BASF Aktiengesellschaft, Ludwigshafen, Germany

[21] Appl. No.: 691,315

[22] Filed: Aug. 2, 1996

[51] Int. Cl.$^6$ ........................... C04B 35/495
[52] U.S. Cl. ................. 106/479; 106/456; 106/457; 106/427; 106/431
[58] Field of Search ................... 106/479, 456, 106/457, 427, 431; 423/594

[56] References Cited

U.S. PATENT DOCUMENTS

| | | | |
|---|---|---|---|
| 4,063,956 | 12/1977 | Higgins | 106/431 |
| 4,115,141 | 9/1978 | Piltingsrud | 106/479 |
| 4,230,500 | 10/1980 | Balducci et al. | 106/479 |
| 4,251,283 | 2/1981 | Balducci et al. | 106/427 |
| 4,455,174 | 6/1984 | Wienand et al. | 106/479 |
| 4,752,460 | 6/1988 | Herren | 106/479 |
| 5,123,965 | 6/1992 | Herren et al. | 106/462 |
| 5,203,917 | 4/1993 | Schwochow | 106/479 |
| 5,273,577 | 12/1993 | Liedek et al. | 106/479 |
| 5,336,312 | 8/1994 | Byrne et al. | 106/479 |
| 5,399,197 | 3/1995 | Vermoortele et al. | 106/479 |
| 5,536,309 | 7/1996 | Etzrodt et al. | 106/479 |
| 5,693,136 | 12/1997 | Vermoortele et al. | 106/479 |

FOREIGN PATENT DOCUMENTS

| | | |
|---|---|---|
| 0 239 526 | 9/1987 | European Pat. Off. . |
| 0 441 101 | 8/1991 | European Pat. Off. . |
| 0 443 981 | 8/1991 | European Pat. Off. . |
| 0 492 244 | 7/1992 | European Pat. Off. . |
| 0 640 566 | 3/1995 | European Pat. Off. . |
| 27 27 864 | 1/1978 | Germany . |
| 31 35 281 | 3/1983 | Germany . |
| 40 37 878 | 6/1991 | Germany . |
| WO 92/11205 | 7/1992 | WIPO . |
| WO 92/19539 | 11/1992 | WIPO . |
| WO 94/01497 | 1/1994 | WIPO . |

OTHER PUBLICATIONS

Cermic Industry, Materials Handbook for Traditional and Advanced Ceramics, vol. 130, No. 1, Jan. 1988, pp. 78–79 (Corcoran Publications).

*Primary Examiner*—Mark L. Bell
*Assistant Examiner*—Louis M. Troilo
*Attorney, Agent, or Firm*—Oblon, Spivak, McClelland, Maier & Neustadt, P.C.

[57] ABSTRACT

Bismuth vanadate pigments I $$Bi_xFe_yE_vV_{(1-w)}P_wO_z \qquad I$$

with the following meanings of the variables:
  E denotes calcium, zinc, cerium, praseodymium, and/or silicon;
  x is a value from 0.8 to 1.2;
  y is greater than 0 to 0.1 when v is greater than 0 or is greater than or equal to 0.035 to 0.1 when v is equal to 0;
  v is greater than or equal to 0 to 0.2;
  w is greater than 0 to 0.1;
  z denotes the number of oxygen atoms required to satisfy the valence requirements of the cations.

and the preparation and use of said pigments for dyeing coating compositions, printing inks, and plastics.

6 Claims, No Drawings

FERRIFEROUS BISMUTH VANADATE PIGMENTS

The present invention relates to novel bismuth vanadate pigments of the general formula I

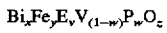

in which the variables have the following meanings:

E denotes calcium, zinc, cerium, praseodymium, and/or silicon;

x is a value from 0.8 to 1.2;

y is greater than 0 to 0.1 when v is greater than 0 or is greater than or equal to 0.035 to 0.1 when v is equal to 0;

v is greater than or equal to 0 to 0.2;

w is greater than 0 to 0.1;

z denotes the number of oxygen atoms required to satisfy the valence requirements of the cations.

The invention further relates to the preparation of these pigments and to their use for dyeing coating compositions, printing inks, and plastics materials.

Bismuth vanadate is an interesting non-toxic yellow pigment particularly suitable for dyeing coating compositions and plastics materials.

In order to improve their application properties, primarily their thermal stability and resistance to chemicals, the pigments usually contain doping agents such as alkaline earth metal, zinc, aluminum, zirconium, molybdate, tungstate, phosphate, and silicate ions (EP-A 239,526, EP-A 441,101, EP-A 443,981, U.S. Pat. No. 4,063,956, U.S. Pat. No. 4,230,500, EP-A 492,244, EP-A 640,566, WO-A 92/11205 and WO-A 92/19539), or they are subsequently provided with protective coverings comprising silicates, phosphates, or metal oxides (DE-A 2,727,864, DE-A 3,135,281 and DE-A 4,037,878). WO-A 94/1497 mentions a bismuth vanadate pigment prepared in the presence of iron nitrate but described as being dull and pale.

However, the known pigments cannot entirely satisfy the coloristic and application requirements. In particular, no brilliant reddish yellow shades can be produced with them.

It is thus an object of the present invention to provide bismuth vanadate pigments for the reddish yellow range of shades, which are characterized by good properties and can advantageously be used for the said applications.

Accordingly we have found the bismuth vanadate pigments defined above.

We have also found a process for the preparation of these pigments by precipitation from an aqueous bismuth-containing solution together with an aqueous vanadium-containing solution, wherein A) adding by stirring into an acid bismuth salt solution, which contains soluble salts of iron and if desired calcium, zinc, cerium, praseodymium, and/or silicon, is added by stirring into an alkaline vanadate solution, which contains soluble phosphate, and the pH of the mixture is adjusted to from 3 to 6.5 with a base and then kept constant by the further addition of base whilst heating to a maximum of 100° C. until the pH ceases to fall, the mixture is then stirred at this temperature until the pH, which begins to rise, stays intrinsically constant, and the the precipitated pigment is then isolated, washed free of salt, dried, and tempered over a period of from 0.5 to 5 hours at from 200° to 700° C., or B) adding by stirring an alkaline vanadate solution, which contains soluble, phosphate, to an acid bismuth salt solution, which contains soluble salts of iron and if desired calcium, zinc, cerium, praseodymium, and/or silicon, with stirring, and the mixture is adjusted to pH 2 to 5 with a base and is then stirred over a period of from 0.5 to 2 hours at this pH, after which the pH is raised to from 5 to 8 and kept constant by further addition of base whilst heating to a maximum of 100° C. until the pH ceases to fall, and the mixture is then stirred at this temperature until the pH stays intrinsically constant, and the precipitated pigment is then isolated, washed free of salt, dried and tempered over a period of from 0.5 to 5 hours at from 200° to 700° C.

We have also found a method of using these pigments for dyeing coating compositions, printing inks, and plastics materials.

The bismuth vanadate pigments of the invention have the following composition

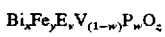

where E denotes praseodymium, silicon or, in particular, cerium, calcium, and/or zinc or mixtures of said metals and the other variables have the following meanings:

x is usually from 0.8 to 1.2 and preferably from 0.9 to 1.1;

y when v is greater than 0,
is usually greater than 0 to 0.1, preferably from 0.005 to 0.07;
and when v is equal to 0,
it is usually from 0.035 to 0.1, preferably from 0.04 to 0.007;

v is usually greater than or equal to from 0 to 0.2, preferably from 0.01 to 0.15;

w is usually greater than 0 to 0.1, preferably greater than 0 to 0.05;

z is the number of oxygen atoms required to satisfy the valence requirements of the cations.

Particularly preferred bismuth vanadate pigments I are those that are doped with iron and phosphorus and also with cerium, calcium, or zinc.

The bismuth vanadate pigments I of the invention are bright pigments in the reddish yellow range of shades and are characterized by excellent properties. They usually have chroma values C* which are greater than or equal to 85, density values L* which are greater than or equal to 70 and also degrees of hue ranging from 78° to 86°, preferably from 80° to 84°. The a*-values (red and green coordinates) are usually greater than 8, preferably greater than 10, and the b* values (blue and yellow cordinates) are generally greater than 80, preferably greater than 85.

The terms C*, L*, hue, a* and b* used in the CIELAB system are adequately disclosed in the literature and have been described, e.g., by Hans G. Völz, in Industrielle Farbpr üfung, Verlag Chemie, Weinheim (1990) and R. W. G. Hunt in Measuring Colour, Ellis Horwood Limited, West Sussex (1987).

According to one of the variants of the process of the invention the preparation of the bismuth vanadate pigments I can advantageously be carried out by precipitation from an acid bismuth salt solution, which contains soluble salts of iron and the desired doping agents E, together with an alkaline vanadate solution containing soluble phosphate.

In process variant a) the procedure adopted is advantageously as follows: the bismuth salt solution is added to the vanadate solution with stirring and the pH of the mixture is adjusted, by addition of a base, to a value of usually from 3 to 6.5 and is kept constant (usually at from 4.5 to 5.5) by the further addition of base whilst heating to a maximum of 100°

C. and after this temperature has been reached, until the pH ceases to fall. Stirring of the mixture is then continued at this temperature until the pH, which begins to rise, remains intrinsically constant (usually after from 0.5 to 5 h). The precipitated pigment is isolated by filtration, washing, and drying and is finally tempered for a further 0.5 to 5 h, in general, at from 200° to 700° C., preferably 200° to 500° C.

The variant a) is especially suitable for the preparation of the particularly preferred bismuth vanadate pigments 1, which contain, as doping agent E, in particular calcium and/or zinc and if desired silicon.

In process variant b) the procedure is usually as follows: the vanadate solution, which may be stabilized by the addition of alkali metal perborate, e.g. $NaBO_2.9H_2O_2.3H_2O$, (usually from 5 to 50, preferably from 5 to 20 mol % of of boron, based on vanadium), is added to the bismuth salt solution with stirring and the pH of the mixture is adjusted with a base to, generally, from 2 to 5 and the mixture is stirred over a period of from 0.5 to 2 hours at this pH. The pH is then raised to usually from 5 to 8 and kept constant by the further addition of base whilst heating to a maximum of 100° C. and after this temperature has been reached, until the pH ceases to fall. Stirring of the mixture is then continued as in a) at this temperature, until the pH, which begins to rise, remains intrinsically constant, which likewise generally takes from 0.5 to 5 h. The pigment is isolated in conventional manner and then subjected to the heat treatment described for variant a).

Variant b) can advantageously be used for the preparation of all of the bismuth vanadate pigments I of the invention.

The soluble starting compounds used for the precipitating reaction in both process variants are advantageously, for example, the following salts:

- ammonium and alkali metal vanadates, in particular potassium vanadate and especially sodium vanadate;
- alkali metal phosphates and hydrogen phosphates, particularly potassium and sodium phosphates, and also phosphoric acid;
- bismuth nitrate;
- iron(III) sulfate, chloride and especially nitrate;
- calcium, zinc, cerium, and praseodymium chlorides and especially nitrates; waterglass and also hexafluorosilicic acid and salts thereof such as zinc hexafluorosilicate;
- as bases primarily alkali metal hydroxides such as potassium hydroxide and especially sodium hydroxide.

The iron salt and the doping agent E need not be present in the dissolved state in the bismuth salt solution; they can be added to the reaction mixture step-wise, if desired. This method is particularly advantageously for doping with silicon. It is particularly advantageous to add further silicate solution to the reaction mixture after the pH has stabilized at a value of from 7.5 to 10.

If desired, the bismuth vanadate pigments of the invention can, to effect further improvement of their thermal stability and also their resistance to chemicals, be subjected to one of the above stabilizing treatments (e.g. coating with silicates, phosphates, or metal oxides). Usually the bismuth vanadate pigments of the invention, particularly those doped with silicon, are sufficiently thermally stable even without subsequent coating and have a photochromism dE of not more than 1.

The pigments of the invention can be used, to advantage, for dyeing coating compositions, printing inks, and plastics materials.

EXAMPLES

Preparation and assessment of bismuth vanadate pigments of the invention

To assess the coloristic properties of the pigments in the coating composition, coatings thereof were first of all prepared as follows: a mixture of 20 g of the respective pigment and 80 g of alkyd-melamine baking lacquer (45 wt % of solids content) was shaken with 150 g of glass balls (3 mm in diameter) for 60 min using a Skandex unit, then applied to aluminum-Q panels to form a coating thereon (spraying method) and baked at 130° C. over a period of 30 min. Measurement of the CIELAB values was then effected using a Zeiss spectrophotometer RFC16. The tristimulus values given in the table (brightness L*; red and green coordinates a*; blue and yellow coordinates b*; hue [°]; chroma C*) are based on the use of standard illuminant D65.

To assess the photochromism, the coatings were in each case half covered with a metallic light shade and then irradiated for 3 h with a 1000 watt floodlight projector (Sylvania, 1000 W halogen lamp, code No. 216,259; lamp distance 45 cm). The dE values were ascertained by comparing readings on the exposed and unexposed areas of the said coatings, taken immediately after exposure, using the above spectrophotometer (mean difference of three readings in each case).

Examples 1 to 5

To a mixture of 196.5 mL of aqueous sodium vanadate solution having a content of 79.92 g of vanadium per liter (equivalent to 15.7 g of vanadium), 500 mL of water and 2.30 g of 85 wt % strength phosphoric acid there were added, with stirring, over a period of 40 min, 621.7 g of bismuth nitrate solution having a content of 11.05 wt % of bismuth (equivalent to 68.7 g of bismuth) and 6 wt % of nitric acid, in which ag of iron nitrate ($Fe(NO_3)_3.9H_2O$), bg of calcium nitrate ($Ca(NO_3)_2.4H_2O$ and cg of zinc nitrate ($Zn(NO_3)_2.6H_2O$) were dissolved.

The pH of the mixture was then adjusted with 30wt % strength sodium hydroxide solution over a period of 1 h to 4.5 and then to 5 using 5 wt % strength sodium hydroxide solution over a period of 10 min.

The resulting light brown suspension was kept at pH 5 by the further addition of sodium hydroxide solution while it was heated to 95° C. After approx. 1 h the suspension turned yellow, and the pH rose to 7.6. The suspension was stirred at 95° C. until the pH stayed constant.

The pigment was filtered off, washed free of salt, made up to a volume of 800 mL with water and then heated to 80° C. To this suspension there was added a solution of 15.4 g of aluminum nitrate ($Al(NO_3)_3.9H_2O$) in 100 mL of water, while the pH of the suspension was kept at 7 by the addition of a 10 wt % strength soda solution. A solution of 8.3 g of calcium nitrate ($Ca(NO_3)_2.6H_2O$) in 100 mL of $H_2O$ was then added concurrently with a solution of 2.7 g of 85 wt % strength phosphoric acid in 100 mL, while the pH of the suspension was kept at 6.5 by further addition of soda solution.

The cooled pigment was filtered off, washed free of salt, dried at 110° C. and then tempered for 30 min at 400° C.

Details of these experiments and the results of the coloristic investigation are listed in the following table.

TABLE 1

| Ex. | a g Fe(NO$_3$)$_3$.9H$_2$O | b g Ca(NO$_3$)$_2$.4H$_2$O | c g Zn(NO$_3$)$_2$.6H$_2$O | Coloristic Data Hue [°] | C* | L* | a* | b* | Photochromism dE |
|---|---|---|---|---|---|---|---|---|---|
| 1* | 1.24 | — | — | 83.8 | 85.8 | 76.0 | 9.2 | 85.3 | 0.4 |
| 2 | 1.86 | 1.82 | 4.58 | 84.9 | 93.2 | 77.7 | 8.3 | 92.9 | 0.4 |
| 3 | 4.98 | — | — | 83.4 | 86.9 | 75.6 | 10.0 | 86.3 | 0.4 |
| 4 | 4.98 | 3.64 | 2.29 | 83.6 | 90.9 | 76.7 | 10.1 | 90.4 | 0.4 |
| 5 | 6.22 | 1.82 | 1.37 | 82.9 | 86.0 | 75.3 | 10.6 | 85.4 | 0.4 |

*the bismuth nitrate solution contained additionally 1.28 g of praseodymium nitrate (Pr(NO$_3$)$_3$.5H$_2$O)

Example 6

To a mixture of 621.7 g of bismuth nitrate solution having a content of 11.05 wt % of bismuth (equivalent to 68.7 g of bismuth) and 6 wt % of nitric acid, in which 1.24 g of iron nitrate (Fe(NO$_3$)$_3$.9H$_2$O) and 2.68 g of cerium nitrate (Ce(NO$_3$)$_3$.6H$_2$O) were dissolved, there were added, with stirring, over a period of 40 min, 196.5 mL of aqueous sodium vanadate solution having a content of 79.92 g of vanadium per liter (equivalent to 15.7 g of vanadium), 500 mL of H$_2$O, 0.53 g of 85 wt % strength phosphoric acid and 0.71 g of sodium perborate (NaBO$_2$.9H$_2$O$_2$.3H$_2$O).

The pH of the mixture was then adjusted with 30 wt % strength sodium hydroxide solution over a period of 1 h to 3.5 and subsequently to 6 with 5 wt % strength sodium hydroxide solution over 10 min.

The resulting light brown suspension was then kept at pH 6 by further addition of sodium hydroxide solution whilst it was heated to 99° C. After approx. 1 h the suspension turned yellow, and the pH rose to 7.9. The suspension was stirred at 99° C. until the pH stayed constant.

The pigment was filtered off, washed free of salt, made up to a volume of 800 mL with water and then heated to 80° C. To this suspension there was added a solution of 15.4 g of aluminum nitrate (Al(NO$_3$)$_3$.9H$_2$O) in 100 mL of water, whilst the pH of the suspension was kept at 7 by the addition of a 10 wt % ig soda solution. A solution of 8.3 g of calcium nitrate (Ca(NO$_3$)$_2$.6H$_2$O) in 100 mL of H$_2$O was added concurrently with a solution of 2.7 g of 85 wt % strength phosphoric acid in 100 mL, whilst the pH of the suspension was kept at 6.5 by further addition of soda solution.

The cooled pigment was filtered off, washed free from salt, dried at 110 dC and subsequently tempered for 30 min at 310 dC.

The pigment thus obtained had the following coloristic data:

Hue [°]: 80.7; C*: 89.2; L*: 72.2; a*: 14.3; b*: 88.0; dE: 0.4.

Example 7

The preparation of the pigment was carried out in a manner similar to that described in Example 6, except that the bismuth nitrate solution additionally contained 6.18 g of soda waterglass (28 wt % of SiO$_2$), diluted 1:10 with water.

Additional pigment stabilization was not carried out. The pigment was dried at 110° C. and tempered for 30 min at 310° C. immediately after it had been isolated by filtration and washed. The pigment thus obtained had the following coloristic data:

Hue [°]: 81.9; C*: 88.2; L*: 73.8; a*: 12.5; b*: 87.3; dE: 0.8.

We claim:

1. A bismuth vanadate pigment of the general formula I $$Bi_xFe_yE_vV_{(1-w)}P_wO_z \qquad I$$

in which the variables have the following meanings:

E denotes calcium, zinc, cerium, praseodymium, and/or silicon;

x is a value from 0.8 to 1.2;

y is greater than 0 to 0.1 when v is greater than 0 or is greater than or equal to 0.035 to 0.1 when v is equal to 0;

v is greater than or equal to 0 to 0.2;

w is greater than 0 to 0.1;

z denotes the number of oxygen atoms required to satisfy the valence requirements of the cations, said pigment having a chroma value greater than or equal to 85, and a hue ranging from 78° to 86°.

2. A bismuth vanadate pigment of the formula I as defined in claim 1, wherein E denotes zinc, calcium, and/or cerium.

3. A bismuth vanadate pigment of the formula I as defined in claim 1 or claim 2, wherein the variables have the following meanings:

x from 0.9 to 1.1;

y from 0.005 to 0.07;

v from 0.01 to 0.15;

w greater than 0 to 0.05;

z is the number of oxygen atoms required to satisfy the valence requirements of the cations.

4. A process for the preparation of bismuth vanadate pigments of the formula I as defined in claim 1 by precipitation from an aqueous bismuth containing solution together with an aqueous vanadium-containing solution, comprising adding by stirring an acid bismuth salt solution, which contains soluble salts of iron and if desired calcium, zinc, cerium, praseodymium, and/or silicon, into an alkaline vanadate solution, which contains soluble phosphate, adjusting the pH of the mixture to from 3 to 6.5 with a base and keeping the pH constant by the further addition of base while heating to a maximum of 100° C. until the pH ceases to fall, then stirring the mixture at this temperature until the pH, which begins to rise, stays intrinsically constant, and precipitating and isolating the resulting pigment, washing it free of salt, drying it and tempering it over a period of from 0.5 to 5 hours at from 200° to 700° C.

5. A process for the preparation of bismuth vanadate pigments of the formula I as defined in claim 1 by precipitation from an aqueous bismuth containing solution together with an aqueous vanadium-containing solution, comprising adding by stirring an alkaline vanadate solution, which contains soluble phosphate, to an acid bismuth salt solution, which contains soluble salts of iron and if desired calcium, zinc, cerium, praseodymium, and/or silicon, adjusting the mixture to pH 2 to 5 with a base and then stirring it over a period of from 0.5 to 2 hours at this pH, thereafter raising the pH to from 5 to 8 and keeping the pH constant by further addition of base while heating to a maximum of 100° C. until the pH ceases to fall, then stirring the mixture at this temperature until the pH stays intrinsically constant, precipitating and isolating the resulting pigment, washing it free of salt, drying it and tempering it over a period of from 0.5 to 5 hours at from 200° to 700° C.

6. A method of dyeing coating compositions, printing inks, and plastic materials, comprising adding thereto a bismuth vanadate pigment of the formula I as defined in claim 1.

* * * * *

UNITED STATES PATENT AND TRADEMARK OFFICE
CERTIFICATE OF CORRECTION

PATENT NO. : 5,753,028
DATED : May 19, 1998
INVENTOR(S) : Harald Ochmann, et al.

It is certified that error appears in the above-indentified patent and that said Letters Patent is hereby corrected as shown below:

On the title page, Item [30], the Foreign Application Priority Data, insert the following:

--Aug.12, 1995   [DE]   Germany...............19529837.3--

Signed and Sealed this

Second Day of February, 1999

Attest:

Attesting Officer

*Acting Commissioner of Patents and Trademarks*